Patented Apr. 30, 1946

2,399,164

UNITED STATES PATENT OFFICE 2,399,164

DEHYDRATION PROCESS

Joseph E. Bludworth, Cumberland, Md., assignor to Celanese Corporation of America, a corporation of Delaware No Drawing. Application June 13, 1944, Serial No. 540,131

14 Claims. (Cl. 260—681)

This invention relates to the catalytic dehydration of polyhydroxy compounds, such as 1,3-butylene glycol, to unsaturated hydrocarbons, such as butadiene, by processes wherein improved yields are obtained.

An object of my invention is to increase the yields of unsaturated hydrocarbons obtained by the catalytic vapor phase dehydration of aliphatic polyhydroxy compounds.

Another object of my invention is to prevent or inhibit the formation of polymerized oils during the vapor phase catalytic dehydration of aliphatic polyhydroxy compounds by diluting the vapors of the starting material with an appreciable amount of gaseous unsaturated hydrocarbon which is preferably of the same composition as the unsaturated hydrocarbon formed in the dehydration process.

Other objects of my invention will appear from the following detailed description.

In the preparation of butadiene by dehydrating 1,3-butylene glycol in the vapor phase at elevated temperatures in the presence of a dehydration catalyst, substantial quantities of a polymerized oil, which appears to be polymerized butadiene, are formed. This oil is an undesired product and its formation results in reduced yields of butadiene.

I have found that if the vapors of the butylene glycol are diluted with butadiene prior to entry into the dehydration zone, the formation of oily polymer is very greatly reduced or even practically eliminated. This discovery is rather surprising since it would be thought that the butadiene would polymerize under the temperature conditions prevailing and that, therefore, the presence of the additional amount of the butadiene that is added to the starting material would cause the formation of an increased amount of oily polymer. While I do not desire to be limited to the explanation of the phenomenon, it is my belief that when the butylene glycol is used as starting material in the pure vapor state, some of the glycol condenses at or near the catalyst (which is probably at a somewhat lower temperature than the surrounding space because of the endothermic reaction involved) and this liquid glycol then decomposes and polymerizes to the undesired oil; whereas when added butadiene is present, the partial vapor pressure of the same prevents condensation of the glycol vapor.

In accordance with my invention, I prepare butadiene, or other unsaturated hydrocarbons, from 1,3-butylene glycol or other polyhydroxy compounds, by diluting the vapors of the polyhydroxy compound with an amount of the unsaturated hydrocarbon in gaseous or vaporous state, and then pass the mixture through a heated zone containing a dehydrating catalyst so as to cause dehydration of the polyhydroxy compound to the unsaturated hydrocarbon. Since the formation of butadiene from 1,3-butylene glycol is at present the most important application of my invention, it will be described in connection therewith.

The amount of butadiene added to the butylene glycol to be dehydrated is preferably appreciable and may range from 4 to 25 parts, and preferably from 8 to 12 parts by weight per one part by weight of the butylene glycol. Part of this butadiene may be replaced by an equivalent amount of water or steam.

The butadiene employed as the diluent may be a portion of the butadiene recovered from the reaction product after the unreacted butylene glycol, water and other products have been separated therefrom by condensation or otherwise. Alternatively, a "hot recycle" may be employed, i. e. part of the whole of the products leaving the reaction zone and containing butadiene, unconverted butylene glycol, steam and other reaction products may be recycled while hot and be mixed with the fresh quantity of vapors of butylene glycol entering the reaction zone.

The temperature of the dehydrating reaction zone is any suitable one, say from 300 to 500° F., and preferably from 350 to 490° F. It is not desirable to employ temperatures appreciably above 500° F., since above 500° F. polymerization of butadiene begins to occur.

Generally atmospheric pressures are employed for the dehydration reaction, but reduced pressures may likewise be used. Pressures somewhat above atmospheric may be employed, but pressures apt to cause condensation of the butylene glycol at the temperatures and under the conditions prevailing are generally to be avoided.

Any suitable dehydration catalyst may be used, examples of which are primary and secondary calcium phosphates, the phosphates of other alkaline earth metals, nickel phosphate, copper phosphate, lead phosphate, di-ammonium phosphate, mercury phosphate, potassium aluminum sulfate, and aluminum oxide. I prefer, however, to employ a catalyst comprising a mixtures of phosphates and phosphoric acid, as disclosed in United States application S. No. 499,230, filed August 19, 1943. Various carriers, such as pumice, graphite and carbon, may be used in connection with any of the foregoing catalysts.

The mixture of vapor of butylene glycol and butadiene is preferably preheated prior to entry to the dehydration reaction zone. In some cases if this mixture is heated at a temperature above the temperature of reaction, say from 20 to 60° F., it is not necessary to apply extraneous heat to the reaction zone. In this connection, it is pointed out that the greater the ratio of the butadiene to the butylene glycol present in the feed mixture, the less extra temperature need be employed in the preheating to obtain this result.

In order further to illustrate my invention, but without being limited thereto, the following examples are given:

Example I

A mixture comprising the following ingredients in the following proportions by weight is preheated to 340° F. by being continuously passed to steam jacketed preheater: 1,3-butylene glycol 38 parts, water 9.4 parts and butadiene (obtain from a previous process) 397 parts. The preheated mixture is then passed to a stainless steel tube containing the dehydrating catalyst described below, which tube is externally heated so that the catalyst has a temperature of 405–420° F. The rate of feed and size of the catalytic mass is such that the vapors and gas pass through the catalytic chamber at a velocity of 25.4 inches per second and the time of contact with the catalyst is 1.1 seconds. The resultant product is then cooled to about 32° F. to separate unconverted butylene glycol and some butenol that is formed, which are returned to the process for further treatment, water and some polymerized oil, the butadiene remaining uncondensed.

The amount of butylene glycol converted to butadiene in this single pass is about 38.5% while the amount converted to the undesired polymerized oil is only 0.33%. Loss amounts to less than 1%.

The dehydration catalyst may be prepared by mixing the following ingredients with water to make a paste—

| | Parts by weight |
|---|---|
| Mono-calcium phosphate | 125 |
| Mono-sodium phosphate | 100 |
| Ethylamine phosphate | 15 |
| Phosphoric acid | 15 |

The ethylamine phosphate may be replaced in whole or in part by an equivalent amount of butylamine phosphate, tributylamine phosphate or ethylene diamine phosphate.

Various carriers such as pumice, graphite or carbon may be added.

The paste is dried at 200 to 300° C. at which temperature it becomes fused and it is broken up and screened so that it has a particle size of about ¼" diameter.

Example II

This is an example of using a "hot recycle" process.

The feed comprises 40 parts by weight of fresh 1,3-butylene glycol and 13.3 parts by weight of fresh water to which are added prior to entry into the preheater a part of the hot gases and vapors leaving the reaction zone and prior to any cooling or separation thereof, the amount of the same that is added comprising 64 parts by weight of butylene glycol, 57.6 parts by weight of butadiene and 95.6 parts by weight of water. The temperatures, velocities, catalyst and other conditions are substantially the same as in Example I. The amount of butylene glycol converted into butadiene is approximately 60% of the amount of fresh butylene glycol that is used and substantially no oily polymer is formed.

It is to be understood that the foregoing detailed description is merely given by way of illustration and that many variations may be made therein without departing from the spirit of my invention.

Having described my invention, what I desire to secure by Letters Patent is:

1. Process for the production of unsaturated hydrocarbons by the dehydration of a polyhydroxy compound comprising subjecting such polyhydroxy compound in vapor form while in admixture with an added amount of such unsaturated hydrocarbon to elevated dehydration temperatures in the presence of a dehydrating catalyst, the unsaturated hydrocarbon being present in the mixture in an amount greater than that of the polyhydroxy compound.

2. Process for the production of butadiene comprising subjecting a mixture of butylene glycol in vapor form and added butadiene to the action of a dehydrating catalyst at elevated temperatures to cause dehydration of butylene glycol to butadiene, the amount of butadiene in the mixture being present in an amount greater than that of the butylene glycol.

3. Process for the production of butadiene comprising subjecting a mixture of butylene glycol in vapor form and added butadiene to the action of a dehydrating catalyst at elevated temperatures not substantially above 500° F. to cause dehydration of butylene glycol to butadiene, the amount of butadiene in the mixture being present in an amount greater than that of the butylene glycol.

4. Process for the production of butadiene comprising subjecting a mixture of butylene glycol in vapor form and added butadiene to the action of a dehydrating catalyst at elevated temperatures of 350 to 490° F. to cause dehydration of butylene glycol to butadiene, the amount of butadiene in the mixture being present in an amount greater than that of the butylene glycol.

5. Process for the production of butadiene comprising subjecting a mixture of butylene glycol in vapor form and butadiene in an amount of at least 4 parts by weight per part of butylene glycol present to the action of a dehydrating catalyst at elevated temperatures to cause dehydration of butylene glycol to butadiene.

6. Process for the production of butadiene comprising subjecting a mixture of butylene glycol in vapor form and butadiene in amount 4 to 25 parts by weight per part of butylene glycol present to the action of a dehydrating catalyst at elevated temperatures to cause dehydration of butylene glycol to butadiene.

7. Process for the production of butadiene comprising subjecting a mixture of butylene glycol in vapor form and butadiene in an amount of at least 4 parts by weight per part of butylene glycol present to the action of a dehydrating catalyst at elevated temperatures not substantially above 500° F. to cause dehydration of butylene glycol to butadiene.

8. Process for the production of butadiene comprising subjecting a mixture of butylene glycol in vapor form and butadiene in amount 4 to 25 parts by weight per part of butylene blycol present to the action of a dehydrating catalyst at elevated temperatures of 350 to 490° F. to cause dehydration of butylene glycol to butadiene.

9. Process for the production of butadiene comprising preheating a mixture of butylene glycol in vapor form and butadiene and then subjecting the same to the action of a dehydrating catalyst at elevated temperatures to cause dehydration of butylene glycol to butadiene, the amount of butadiene in the mixture being present in an amount greater than that of the butylene glycol.

10. Process for the production of butadiene comprising preheating a mixture of butylene glycol in vapor form and butadiene which has been recovered from a previous dehydration process and then subjecting the same to the action of a dehydrating catalyst at elevated temperatures to cause dehydration of butylene glycol to butadiene, the amount of butadiene in the mixture being present in an amount greater than that of the butylene glycol.

11. Process for the production of butadiene comprising subjecting a mixture of butylene glycol in vapor form and butadiene to the action of a dehydrating catalyst at elevated temperatures to cause dehydration of butylene glycol to butadiene, the amount of butadiene in the mixture being present in an amount greater than that of the butylene glycol and recycling a part of the hot reaction mixture leaving the reaction zone with fresh butylene glycol to the reaction zone.

12. Process for the production of butadiene comprising subjecting a mixture of butylene glycol in vapor form, added butadiene and steam to the action of a dehydrating catalyst at elevated temperatures to cause dehydration of butylene glycol to butadiene, the amount of butadiene in the mixture being present in an amount greater than that of the butylene glycol.

13. Process for the production of butadiene comprising preheating a mixture of butylene glycol in vapor form and butadiene to a temperature above that required to dehydrate the glycol in the presence of a dehydrating catalyst, the amount of butadiene being present in the mixture in an amount greater than that of the butylene glycol, and then subjecting the mixture to the action of a dehydrating catalyst to cause dehydration of butylene glycol to butadiene.

14. Process for the production of butadiene comprising preheating a mixture of butylene glycol in vapor form and butadiene to a temperature of 20 to 60° F. above that required to dehydrate the glycol in the presence of a dehydrating catalyst, the amount of butadiene being present in the mixture in an amount greater than that of the butylene glycol, and then subjecting the mixture to the action of a dehydrating catalyst to which no extraneous heat is applied to cause dehydration of butylene glycol to butadiene.

JOSEPH E. BLUDWORTH.